(12) United States Patent
Ganter et al.

(10) Patent No.: US 9,239,108 B2
(45) Date of Patent: Jan. 19, 2016

(54) SHIFT-BY-WIRE TRANSMISSION RANGE SELECTOR SYSTEM AND ACTUATOR FOR THE SAME

(75) Inventors: Brian Ganter, Foxborough, MA (US); Robert DiTommaso, Waltham, MA (US); Norman Poirier, Raynham, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 704 days.

(21) Appl. No.: 12/954,796

(22) Filed: Nov. 26, 2010

(65) Prior Publication Data

US 2011/0126657 A1 Jun. 2, 2011

Related U.S. Application Data

(60) Provisional application No. 61/264,755, filed on Nov. 27, 2009.

(51) Int. Cl.
| | |
|---|---|
| *B60K 17/04* | (2006.01) |
| *F16H 61/32* | (2006.01) |
| *F16H 61/12* | (2010.01) |
| *F16H 63/34* | (2006.01) |
| *F16H 63/30* | (2006.01) |

(52) U.S. Cl.
CPC ............... *F16H 61/32* (2013.01); *F16H 61/12* (2013.01); *F16H 63/3458* (2013.01); *F16H 63/3466* (2013.01); *F16H 2061/122* (2013.01); *F16H 2061/1232* (2013.01); *F16H 2061/1268* (2013.01); *F16H 2061/326* (2013.01); *F16H 2063/3089* (2013.01); *Y10T 74/2003* (2015.01)

(58) Field of Classification Search
CPC ................... F16H 2061/1292; F16H 63/3491; F16H 63/3416

USPC ................ 74/473.1, 473.12, 473.21–473.24, 74/473.3
See application file for complete search history.

(56) References Cited

U.S. PATENT DOCUMENTS

| | | | |
|---|---|---|---|
| 5,094,115 A | 3/1992 | Michihira et al. | |
| 5,704,457 A * | 1/1998 | Kimura et al. | ............. 192/220.2 |
| 6,481,556 B1 * | 11/2002 | Haupt | ......................... 192/219.5 |
| 6,550,351 B1 | 4/2003 | O'Reilly et al. | |
| 6,688,448 B2 * | 2/2004 | Giefer et al. | ................ 192/219.4 |
| 6,752,036 B2 * | 6/2004 | Kropp et al. | ................ 74/473.12 |
| 7,354,372 B2 | 4/2008 | Wang | |

(Continued)

OTHER PUBLICATIONS

International Search Report and Written Opinion dated Jan. 31, 2011 issued in related International Patent Application No. PCT/US10/58133.

*Primary Examiner* — William Kelleher
*Assistant Examiner* — Emily Cheng
(74) *Attorney, Agent, or Firm* — Grossman, Tucker, Perreault & Pfleger, PLLC (57) ABSTRACT

In general, a shift-by-wire transmission range selector system consistent with the present disclosure may include an actuator one or more electric motors to allow the actuator to operate for shifting the gear position of a transmission. In the event of a power or system failure, a fail safe release motor may be actuated by energy stored in a capacitor. The fail safe release motor drives a slide cam to release a trigger arm. Upon release of the trigger arm, a spring-driven mechanism safely returns the transmission to the PARK position by rotating an output shaft. A redundant control link may be provided, configured to actuate the fail safe release motor in the event of a power or system failure.

20 Claims, 13 Drawing Sheets

(56) References Cited

U.S. PATENT DOCUMENTS

| | | | |
|---|---|---|---|
| 2005/0044979 A1* | 3/2005 | Fort et al. | 74/473.21 |
| 2007/0144303 A1 | 6/2007 | Sato et al. | |
| 2008/0173121 A1 | 7/2008 | Kimura et al. | |
| 2008/0302627 A1* | 12/2008 | Kato et al. | 192/219.5 |
| 2008/0302628 A1* | 12/2008 | Kimura et al. | 192/220 |
| 2009/0069151 A1 | 3/2009 | Koski et al. | |
| 2009/0217782 A1* | 9/2009 | Wang | 74/473.21 |

* cited by examiner

SHIFT-BY-WIRE TRANSMISSION RANGE SELECTOR SYSTEM AND ACTUATOR FOR THE SAME

CROSS-REFERENCE TO RELATED APPLICATIONS

This application claims the benefit of U.S. provisional patent application Ser. No. 61/264,755, filed Nov. 27, 2009, the entire disclosure of which is incorporated herein by reference.

TECHNICAL FIELD

The present invention relates in general to a shift-by-wire transmission range selector system and an actuator for the same.

BACKGROUND

Conventional automobile transmissions are controlled through a gear shift assembly connected to the transmission through a mechanical linkage. The gear shift is normally prominently positioned adjacent the driver's seat for easy access. In a vehicle having either an automatic or a manual transmission, to change the transmission gear position the operator moves the gear shift to a position corresponding to the intended gear position, e.g., park, neutral, drive, reverse, etc.

Unfortunately, known mechanical transmission gear shift assemblies occupy a significant amount of passenger compartment space. Compartment space has always been a valuable commodity in automobile design. With the introduction of new features and technologies to automobiles, compartment space is becoming increasingly valuable.

Recently, shift-by-wire transmission range selector systems have been implemented in automobiles, e.g. to save space in the interior compartment. In a shift-by-wire system, a driver manipulates a driver interface module to control operation of an electro-mechanical actuator associated with the transmission. The actuator moves the transmission to an intended gear position in response to position selected by the driver on the driver interface module. The mechanical linkage from the driver shift assembly to the transmission is thus replaced by an electrical connection to the actuator.

BRIEF DESCRIPTION OF THE DRAWINGS

Advantages of the present invention will be apparent from the following detailed description of exemplary embodiments thereof, which description should be considered in conjunction with the accompanying drawings, in which:

FIGS. 3-10B illustrate front, partial sectional views of an actuator consistent with the present disclosure showing operation of the actuator for positioning the actuator in PARK upon a system failure;

DETAILED DESCRIPTION

In general, a shift-by-wire transmission range selector system consistent with the present disclosure may include an actuator having redundant electric motors to allow the actuator to operate for shifting the gear position of a transmission after failure of one motor. Also, the dual, redundant motor configuration allows the actuator to provide required output torque for changing the gear position at low voltage and high temperature without requiring significant gear reduction. In the event of a power or system failure, a fail safe release motor is actuated by energy stored in a capacitor. The fail safe release motor drives a slide cam to release a trigger arm. Upon release of the trigger arm, a spring-driven mechanism safely returns the transmission to the PARK position by rotating an output shaft. A magnet coupled to the output shaft may provide rotational position information to electronics on a printed circuit board (PCB) for controlling the system. A redundant control link may be provided, configured to actuate the fail safe release motor in the event of a power or system failure. Although embodiments of an actuator consistent with the present disclosure may be described herein as including both a redundant motor configuration and a fail safe release motor (sometimes referred to herein as a "third motor" or "$3^{rd}$ motor") it is to be understood that an actuator consistent with the present disclosure may include either of these features alone, or both of these features in combination. It is to be understood, that illustrated exemplary embodiments described herein are provided only by way of illustration, and are not intended to be limiting.

Figure 1:
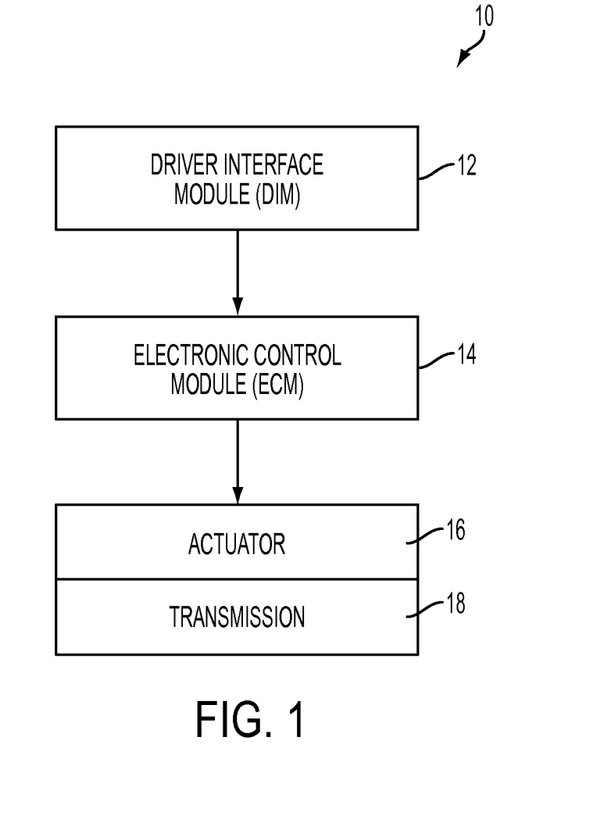
FIG. 1 is a block diagram of an exemplary transmission range selector system consistent with the present disclosure.

Referring to FIG. 1, there is shown a block diagram of an exemplary shift-by wire transmission range selector system 10 consistent with the present disclosure. As shown, the system includes a driver interface module 12 (hereinafter "DIM"), an electronic control module 14 (hereinafter "ECM"), and an actuator 16 mounted to an automobile transmission 18.

Generally, the DIM 12 includes a shift accessible to the driver. The shift may be positioned by the driver to designate a desired transmission gear position, e.g. "P" for park, "R" for reverse, "N" for neutral, "D" for drive, etc. The DIM 12 may include position-sensing electronics, e.g., Hall effect sensors, which provide an output signal to the ECM 14 that is representative of the desired transmission gear position selected by the driver at the DIM. The ECM, in turn, provides an output signal to the actuator 16.

The actuator 16 may be mounted directly to the automobile transmission 18, and, in response to the ECM output, changes the transmission gear position to the position designated by the driver. The actuator 16 may also include position-sensing electronics, e.g., Hall effect sensors, which provide an output to the ECM 14 corresponding to the actual transmission gear position. The ECM output signal may be provided to the actuator 16 on the basis of the desired transmission gear position set at the DIM 12 and the actual transmission gear position from the actuator 16. One example of a DIM and ECM useful in connection with a system consistent with the present disclosure is described in U.S. Pat. No. 6,550,351, the teachings of which are hereby incorporated herein by reference.

Figure 2:
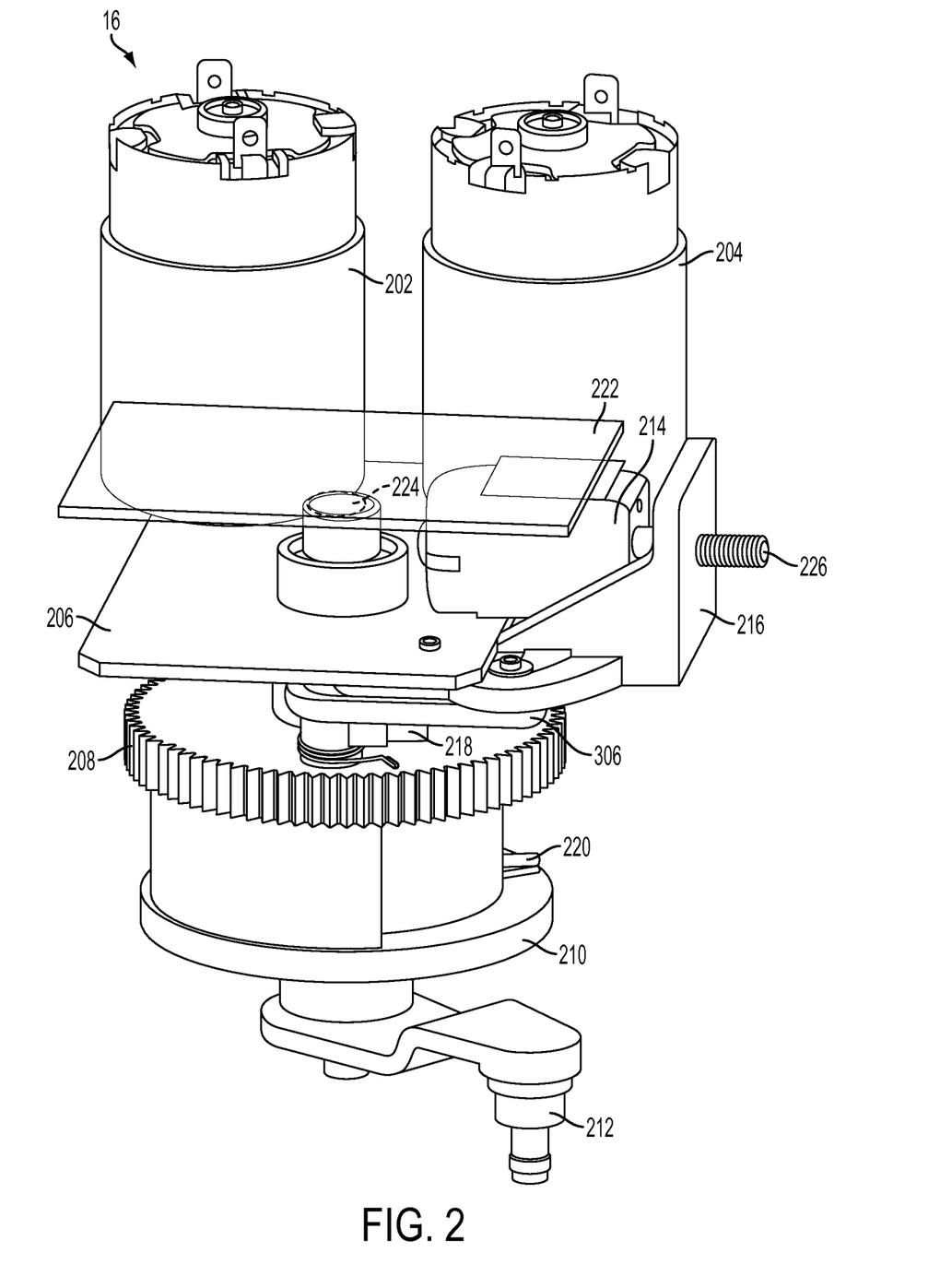
FIG. 2 is a perspective view of one exemplary embodiment of an actuator consistent with the disclosure.

FIG. 2 is a perspective view of an exemplary actuator 16 consistent with the present disclosure. The illustrated actuator generally includes first 202 and second 204 redundant drive motors, a mounting plate 206, gear train including an output gear 208, an output shaft 210, an output cable drive arm 212 coupled to the output shaft, a fail safe release motor 214, a slide cam 216, a fail safe release mechanism 218, a fail safe release torsion spring 220, a PCB 222 including a Hall effect sensor, and a magnet 224 coupled to an first end of an output shaft.

In general, the redundant drive motors 202, 204 may be mounted to the mounting plate with their associated drive shafts extending therethrough. As shown for example in FIG. 3, each drive shaft may have a pinion 310, 312 thereon in meshing engagement with a compound spur gear 302. The redundant motors 202, 204 may simultaneously drive the spur gear 302 in the same direction. A central gear portion 314 of compound spur gear may be in meshing engagement with the output spur gear 208. The redundant motors 202, 204 may therefore simultaneously drive the output gear 208 with the compound gear 302 providing gear reduction. The output gear 208 may be coupled to the output shaft 210 through the fail safe mechanism for rotating the output shaft 210 and the output cable drive arm 212 affixed thereto. The output cable drive arm 212 may be coupled to the transmission for changing the transmission gear position. Thus, an ECM 14 may control the drive motors 202, 204 for driving the output cable drive arm 212 to selectively change the transmission gear position in response to operator input through a DIM 12.

Figure 3:
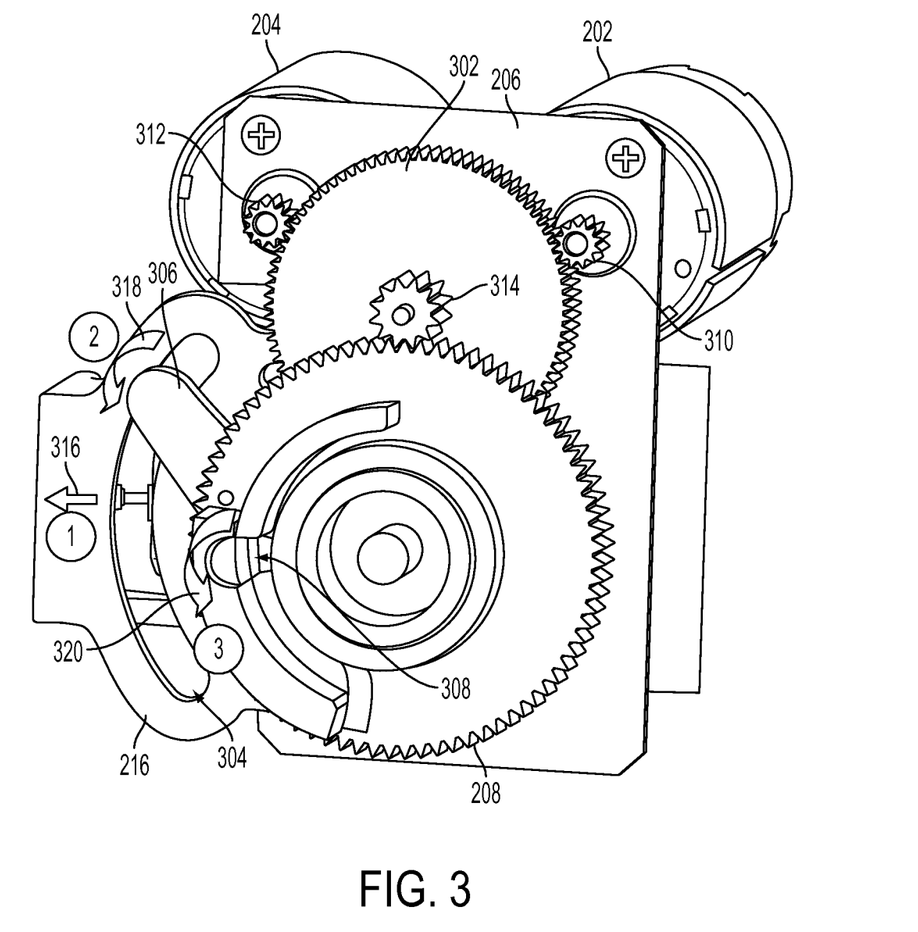

The dual, redundant motor configuration allows the actuator 16 to provide required output torque for changing the gear position at low voltage and high temperature without requiring significant gear reduction, e.g. with the motor pinions driving the output spur gear 208 through a single compound gear 302. Also, each of the redundant motors 202, 204 may be configured to operate to shift the gear position of a transmission after failure of the other motor.

FIGS. 3-10 illustrate and describe operation of an actuator 16 consistent with the present disclosure for safely positioning the transmission in a PARK mode in the event of a system failure. A system failure may be detected, for example, when 12 VDC input power and CAN or LIN bus communication with the actuator is lost for a predetermined time period. For example, 12 VDC input power may be considered lost when a vehicle battery voltage drops below 9 volts. The CAN (controller area network) bus corresponds to a vehicle bus standard designed to allow microcontroller(s) and device(s) to communicate with each other in a vehicle without a host computer. The LIN (local interconnect network) corresponds to a vehicle bus standard, configured generally as a sub-network of the CAN bus to integrate intelligent sensor devices and/or actuators. As shown in FIGS. 2 and 3, when this occurs the fail safe release motor 214 ($3^{rd}$ motor in FIG. 2) drives the slide cam 216 in the direction of a first arrow 316 in FIG. 3. In the illustrated embodiment, the fail safe release motor 214 includes a worm gear 226 at the output thereof and is mounted to the mounting plate 206. The worm gear 226 passes through a corresponding threaded opening in the slide cam 216. The slide cam 216 is slidably mounted to the mounting plate 206. Rotation of the worm gear 226 by the fail safe release motor 214 thus causes the slide cam 216 to slide relative to the mounting plate 206 and travel along the worm gear 226 in a direction depending on the direction of rotation of the worm gear 226.

Figure 4:
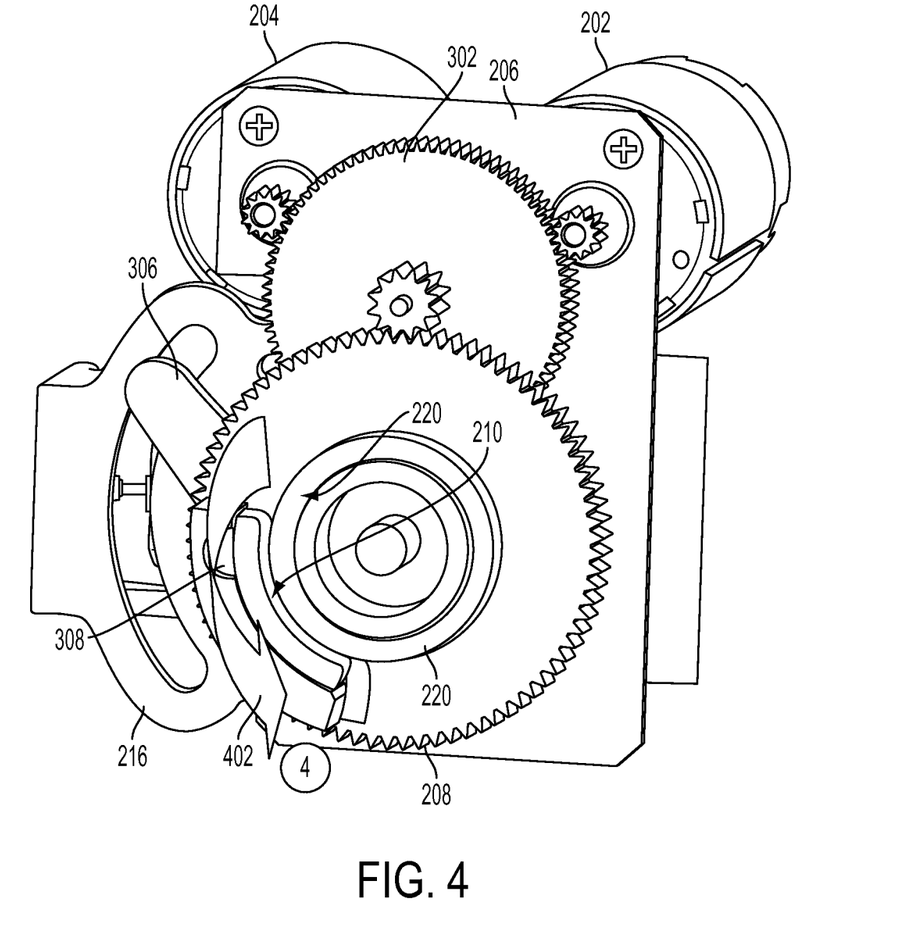

The slide cam 216 includes an arcuate cam guide opening 304 therein for receiving and guiding an end of a trigger arm 306. Movement of the slide cam 216 outwardly, in the direction of the first arrow 316, causes downward rotation of the trigger arm 306, i.e. in the direction of a second arrow 318 in FIG. 3. The trigger arm 306 is coupled to a trigger pawl 308. Rotation of the trigger arm 306 causes corresponding rotation of the trigger pawl 308 in a direction of a third arrow 320 in FIG. 3. In FIG. 3, the trigger pawl 308 is shown in a released position, allowing the output shaft 210 to rotate to a PARK position. As illustrated in FIG. 4, when the trigger pawl 308 is in a released position, the torsion spring 220 coupled between the output gear 208 and the output shaft 210 rotates the output shaft 210 (in a direction of a fourth arrow 402) to the PARK position, while the output gear 208 remains stationary, e.g. in DRIVE or whatever position it was in when the failure occurred.

Figure 5:
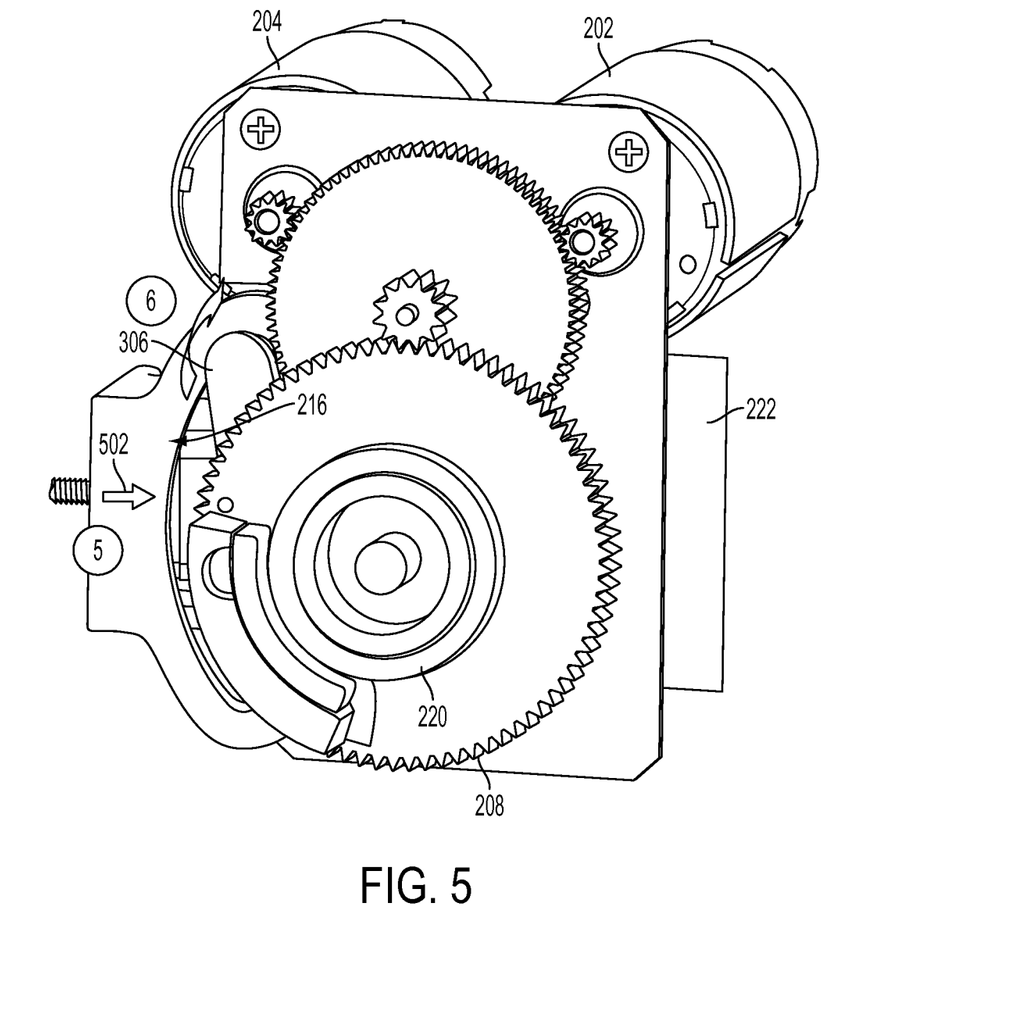

As shown in FIG. 5, when the system failure is resolved, e.g. when 12 VDC power is restored and/or a CAN command signal is received, the fail safe release motor 214 may be energized to retract the slide cam 216. The slide cam 216 may thus move inward toward the mounting plate 222 in a direction of a fifth arrow 502 thereon, thereby rotating the trigger arm 306 inward back to its normal (i.e., system energized by vehicle battery and able to communicate) position. In this position, the output gear 208 is still in DRIVE and the output shaft 210 and arm are still defaulted in a PARK position.

Figure 6:
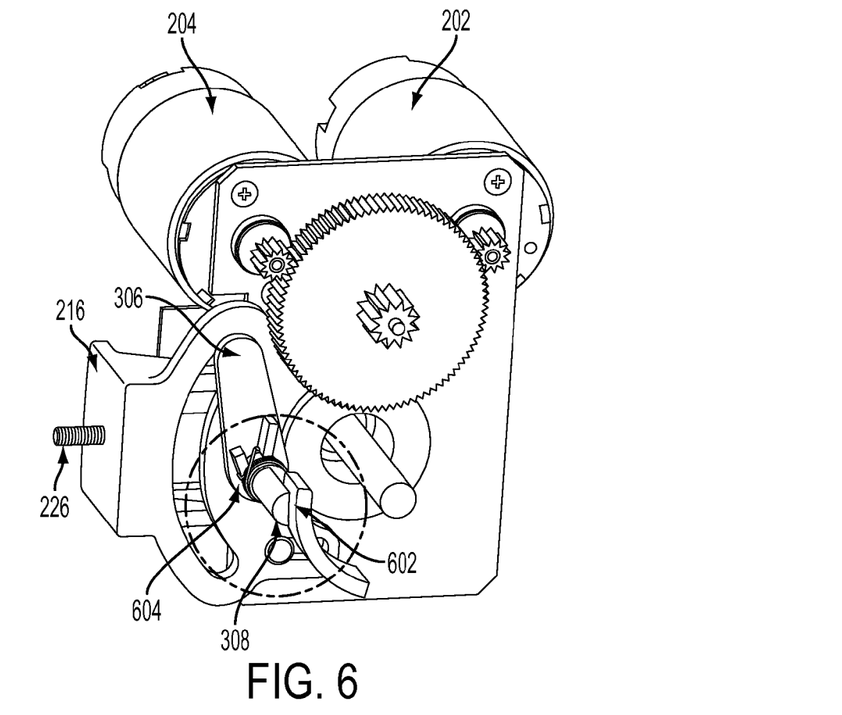
Figure 7:
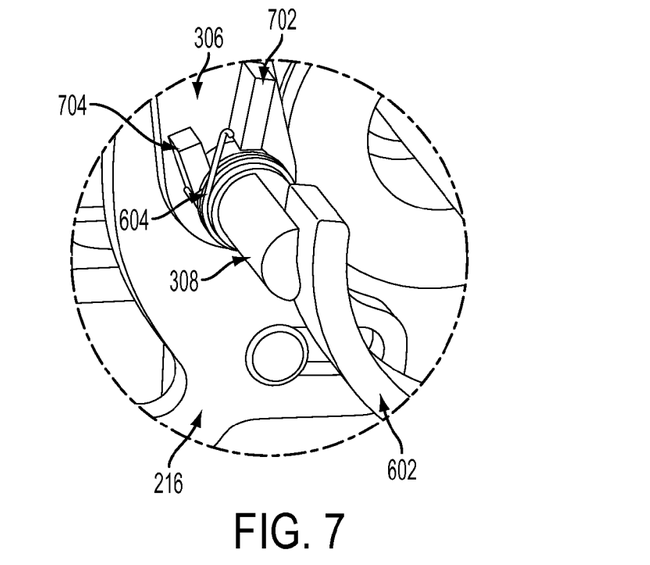

As shown in FIG. 6, rotation of the trigger pawl 308 into the lock position is prevented by a tab feature 602 on the output shaft. FIG. 7 shows the orientation of the tab feature 602 on the output shaft 210 relative to the trigger arm 306 and the trigger pawl 308. As shown, the trigger arm 306 and trigger pawl 308 may be rotatable about a common rotational axis. A torsion spring 604 may be disposed between a tab 702 on the trigger arm 306 and corresponding tab 704 on the trigger pawl 308 to facilitate rotation of the trigger pawl 308 with rotation of the trigger arm 306, but to allow the trigger pawl 308 to flex relative to the trigger arm 306.

Figures 8, 9:
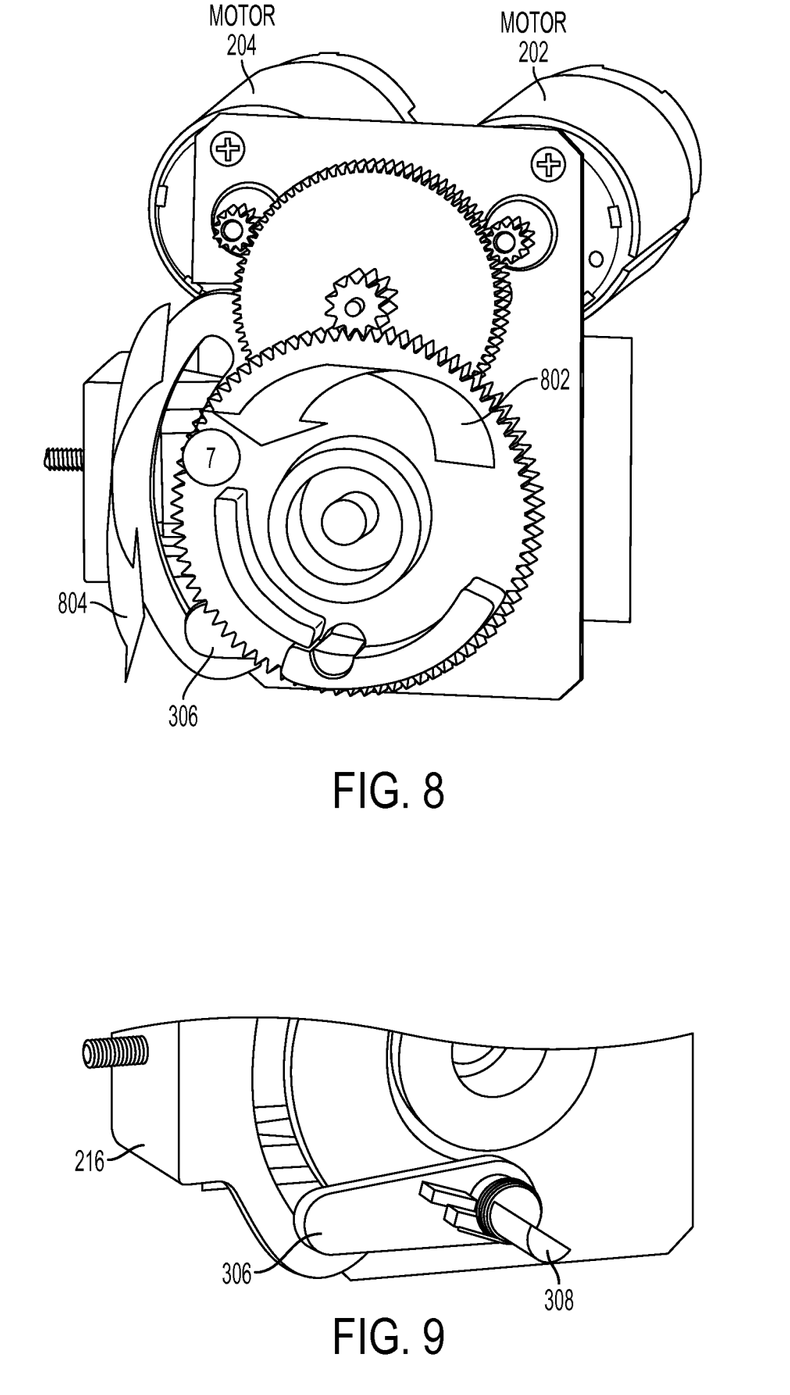
Figure 10A:
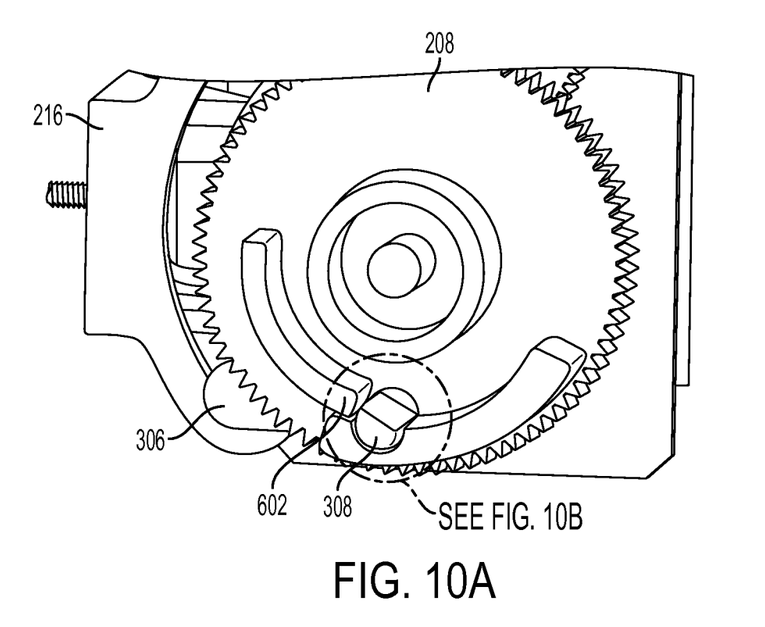
Figure 10B:
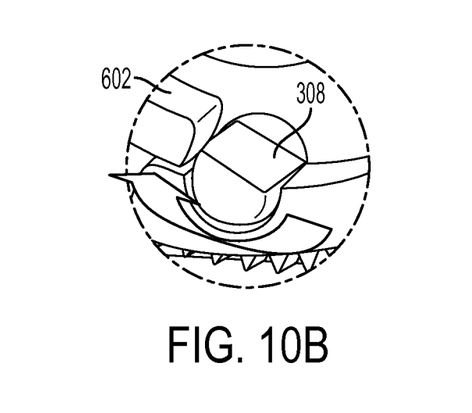

As shown in FIG. 8, the first and second drive motors 202, 204 may then drive the output gear 208 in the direction of a sixth arrow 802 shown on the output gear to the PARK position. As the output gear 208 rotates, the trigger arm 306 is guided downward in the direction of a seventh arrow 804 to the bottom of the slide cam guide opening 304 as shown in FIG. 9. As shown in FIGS. 10A and 10B, as soon as the output gear 208 has rotated the trigger arm 306 and trigger pawl 308 past the end of the output shaft tab 602, the trigger pawl torsion spring 604 rotates the trigger pawl 308 to latch the system in a normal operating mode, i.e. the trigger pawl 308 is positioned to engage the output shaft tab 602 with clockwise rotation of the output gear 208 to cause corresponding rotation of the output shaft 210.

In order to safely return the vehicle transmission to a PARK position in the event of a system or battery failure, an independent source of power for energizing the fail safe release motor 214 is provided in a system consistent with the present disclosure. For example, one or more capacitors may be utilized to provide the independent source of power for energizing the fail safe release motor 214. The capacitor(s) may be charged from the vehicle battery and the charged capacitor(s) may be used to energize the fail safe release motor 214 in the event of a failure of vehicle power. Vehicle battery voltage is typically in the range of 9 to 16 volts DC for a "12 volt" battery. A voltage at or below 9 Vdc may be considered a failure while voltages greater than 16 Vdc may be possible in some failure conditions, e.g., vehicle voltage regulator failure. Accordingly, the capacitor(s) should have a voltage rating greater than an anticipated maximum supply voltage. For example, capacitor(s) with voltage ratings of 25 volts or higher may be desirable.

Energy stored in capacitor(s) charged by the vehicle battery may be $\frac{1}{2}*C*81$ joules (i.e., $\frac{1}{2}*C*V^2$ with V=9 Vdc), where C is the total capacitance of the capacitor(s). In order to supply sufficient energy for energizing the fail safe release motor 214, a relatively high capacitance may be necessary (assuming a supply (e.g., battery) voltage of 9 Vdc). Such a capacitor (or plurality of capacitors coupled in parallel) may be physically too large to fit on the PCB 222. It may therefore be desirable to increase a supply voltage to the capacitor(s) to supply the desired energy with smaller capacitor(s), i.e., reduced capacitance and therefore a smaller physical size. The stored energy in a capacitor is proportional to the square of the supply voltage while the stored energy is merely proportional to the capacitance. In other words, an increase supply voltage may result in an increase in stored energy greater than the increase in stored energy resulting from a corresponding increase in capacitance (because the voltage is squared in the energy equation).

Figure 11:
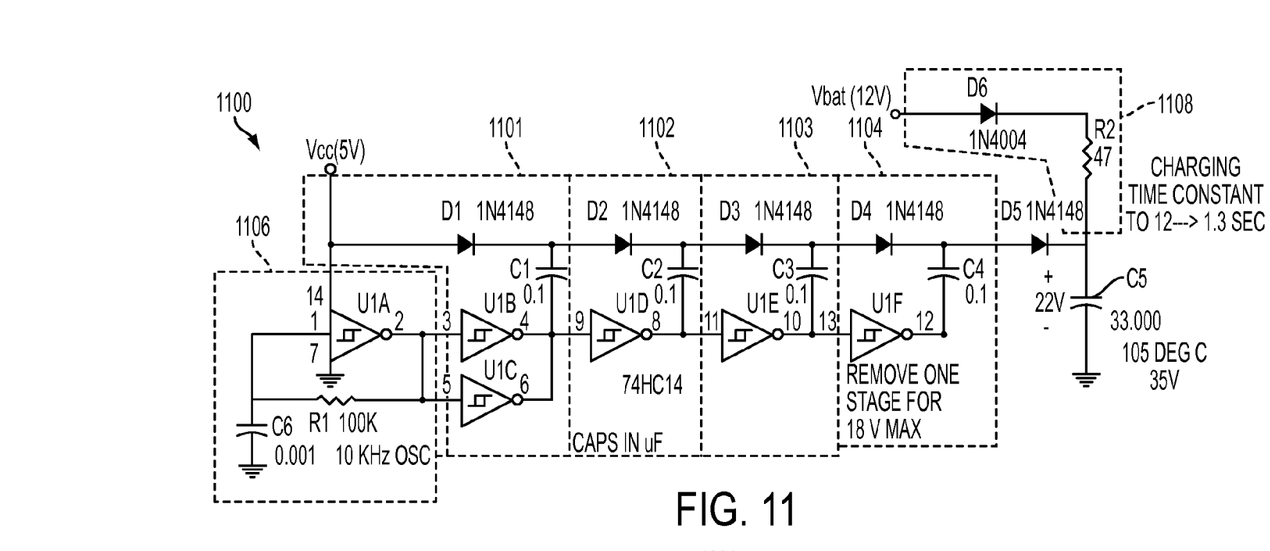
FIG. 11 is a schematic circuit diagram illustrating a circuit for charging a capacitor to for energizing a fail safe release motor consistent with the present disclosure.
Figure 12:
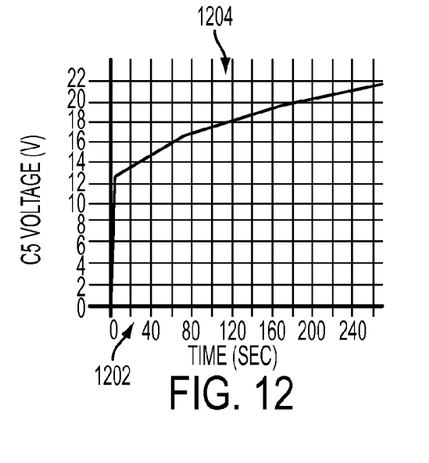
FIG. 12 is a plot of the voltage across capacitor C5 in FIG. 11 vs. time in an exemplary system consistent with the present disclosure.

It may be desirable to provide a stored energy that is independent of vehicle battery voltage when the vehicle battery voltage is in or near its normal operating voltage range. For example, a voltage multiplier (e.g., a charge pump) may be used to generate a voltage greater than a supply voltage. FIGS. 11 and 12 illustrate one embodiment configured to provide sufficient energy storage for supplying the fail safe release motor as described herein. In this embodiment, a supply voltage of 5 Vdc, nominal, is used. For example, a voltage regulator may be used that is configured to receive vehicle battery voltage and to provide an output voltage of 5 volts. The output voltage of the voltage regulator corresponds to the supply voltage of 5 Vdc, nominal. A multistage voltage multiplier, supplied by the voltage regulator, may then provide an increase in output voltage versus input voltage of about 5 volts, for each stage of the multistage voltage multiplier. For example, a four stage voltage multiplier, supplied by 5 volts, may yield an output voltage of about twenty volts (i.e., four stages times 5 volts per stage). Energy stored in capacitor(s) supplied by 20 volts is then $\frac{1}{2}*C*20^2$ or $\frac{1}{2}*C*400$ joules, about a five-fold increase compared to the same capacitor(s) supplied by 9 Vdc. More or fewer stages may be implemented to achieve a higher or lower output voltage. Further, a voltage regulator configured to output a voltage other than 5 volts may also be used, as will be understood by one skilled in the art.

FIG. 11 illustrates one embodiment of circuitry 1100 configured to generate and store energy for supplying the fail safe release motor 214, as described herein. Capacitor C5 is the storage capacitor configured to supply the fail safe release motor 214. Capacitor C5 may include one or more capacitors of a desired total capacitance. For example, the capacitance may be in the range of 33,000 uF to 44,000 uF. Other capacitances may be used. Capacitor C5 is configured to be charged from the battery (Vbat) and/or a voltage supply (e.g., a voltage regulator) Vcc via a plurality of voltage multiplier stages (e.g., stages 1101, 1102, 1103, 1104). For example, Vcc may be 5 volts. Circuitry 1100 includes a relaxation oscillator 1106 configured to drive the plurality of stages 1101, 1102, 1103, 1104. Each stage includes an inverting Schmitt trigger (e.g., U1B, U1D, U1E, U1F), a diode and a capacitor (e.g., capacitors C1, C2, C3, C4). The inverting Schmitt triggers may be configured as astable or bistable multivibrators. The capacitors C1, C2, C3, C4 are configured to limit an initial surge current from the voltage regulator. Limiting initial surge current may result in a relatively long charge time for the storage capacitor C5 from the voltage regulator. Battery quick charge circuitry 1108 is configured to reduce the initial charge time without affecting the limit on the initial surge current from the voltage regulator. Battery quick charge circuitry 1108 is configured to charge storage capacitor C5 to near the vehicle battery voltage, Vbat (e.g., 12 volts) in approximately one second. The relatively short quick charge time exploits the greater current capacity of the vehicle battery and may be set by resistor R2. The multiplier stages 1101, 1102, 1103, 1104 may then continue to charge storage capacitor C5 over a number of minutes to reach a maximum charge voltage of about 22 volts (with a voltage regulator output voltage of about 5.5 volts).

The voltage across supply capacitor C5 versus time is shown in FIG. 12. An initial, relatively steep increase 1202 in capacitor C5 voltage due to the battery quick charge is followed by a more gradual increase 1204 in capacitor C5 voltage due to the voltage multiplier circuit.

It may be appreciated that FIG. 11 represents one exemplary embodiment and that other voltages and/or charging characteristics are possible and remain within the scope of the present disclosure. For example, to decrease the final voltage across the capacitor C5 to less than 22 volts, a stage, e.g., stage 1104, may be removed from circuit 1100. Removing the stage may allow use of a capacitor rated at 25 volts (or less) for C5.

Figure 13A:
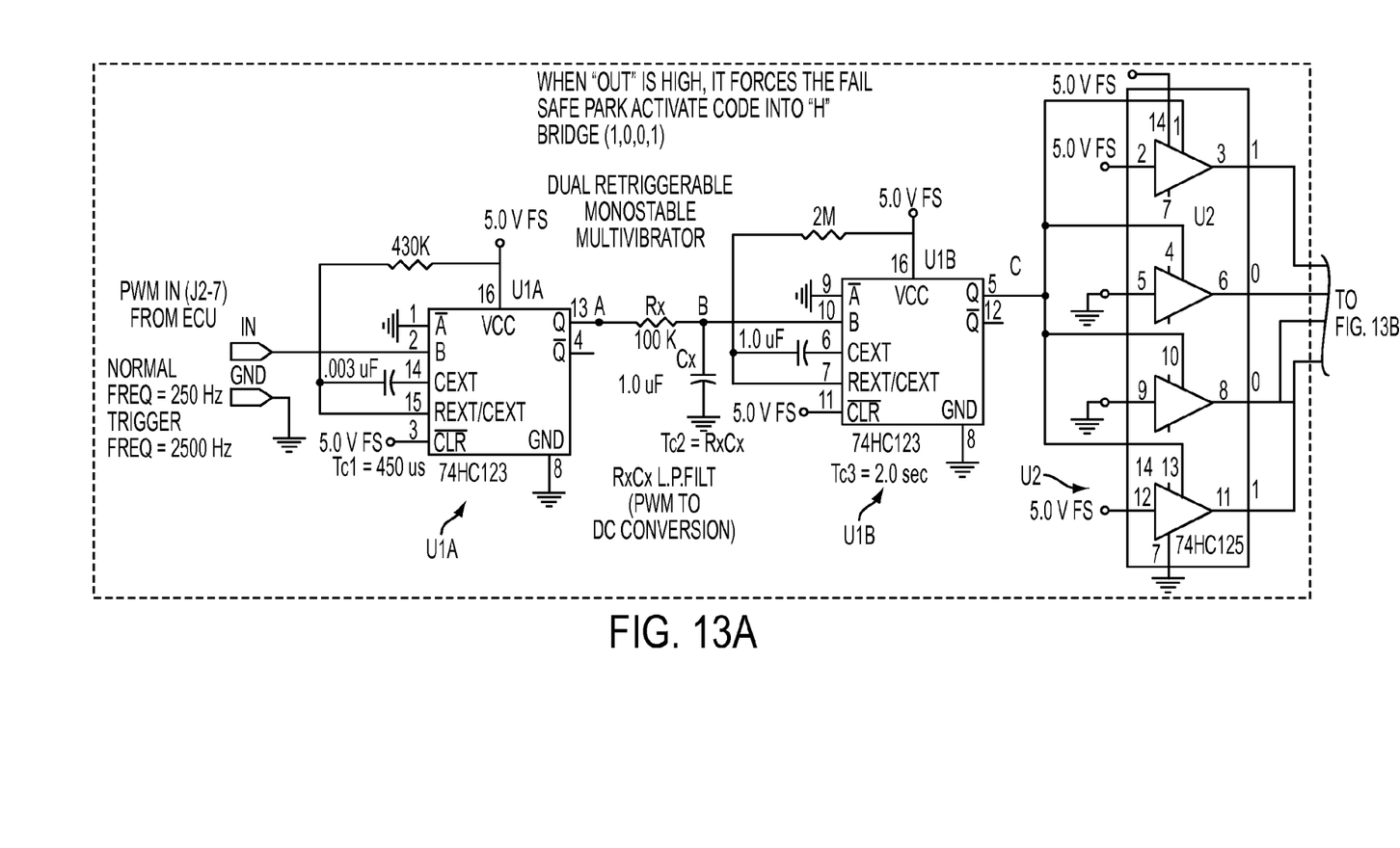
FIGS. 13A and 13B are portions of a schematic circuit diagram illustrating a circuit for driving the fail safe release motor in case of a system failure consistent with the present disclosure.
Figure 13B:
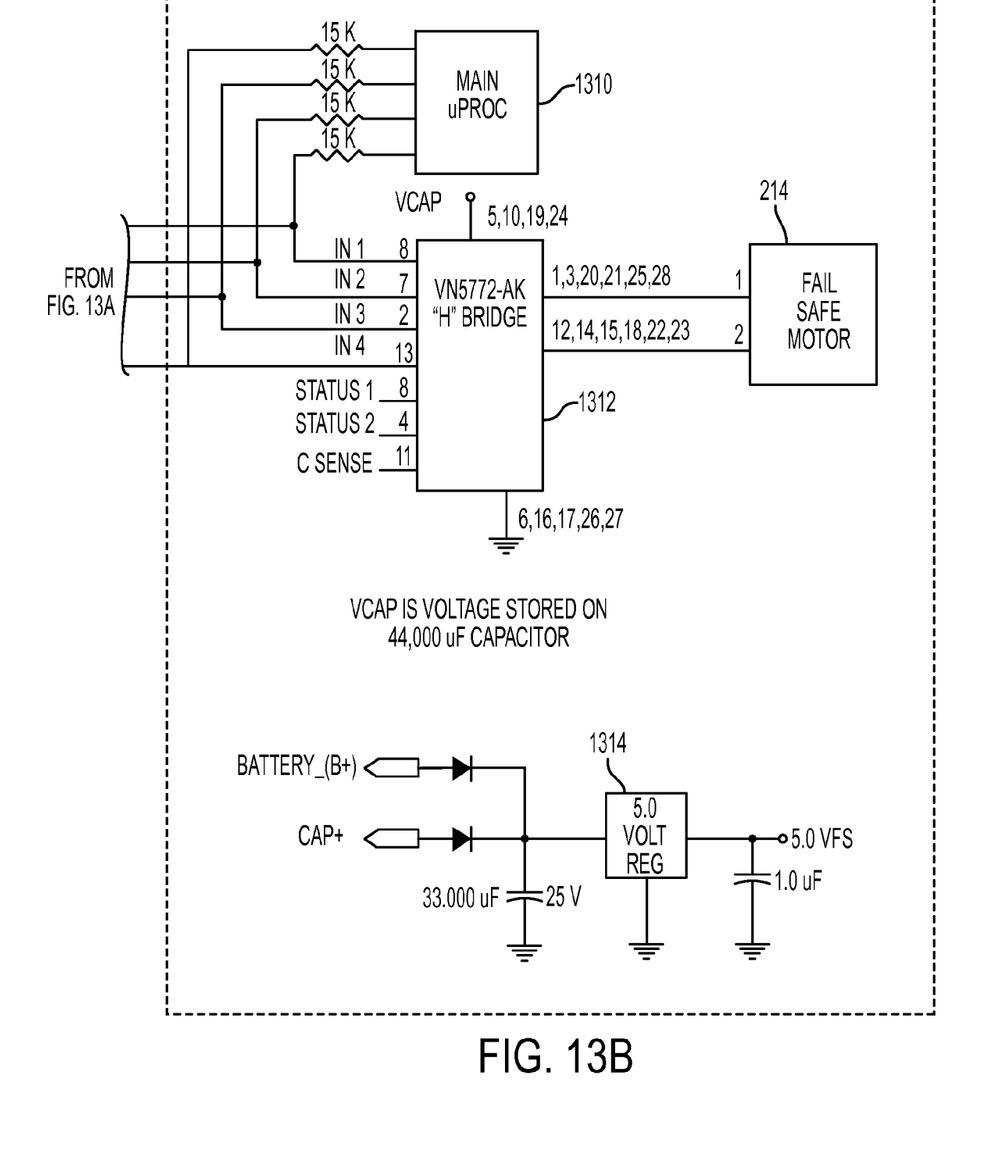

FIGS. 13A and 13B illustrate a system (circuitry) configured to drive the fail safe release motor 214 to return the transmission to the PARK position in the event of a failure of the shift-by-wire (SBW) controller function of, e.g., the ECM 14. Failure includes, but is not limited to, a CAN bus failure, microprocessor failure and/or loss of battery power. Normal operation of the SBW function may be accomplished via a CAN bus link between the ECM 14 and a vehicle electronic control unit (ECU) and/or a CAN bus link between the ECM 14 and the actuator 16. Normal shift commands and/or the emergency return to park function, as described herein, may be transmitted and/or received via the CAN bus. The SBW system 10 may include an additional redundant pulse width modulation (PWM) link for operation in case of a CAN bus network failure. The PWM link is configured to operate at 250 Hz normally, i.e., normal operation of the CAN bus network and microprocessor.

Figure 14:
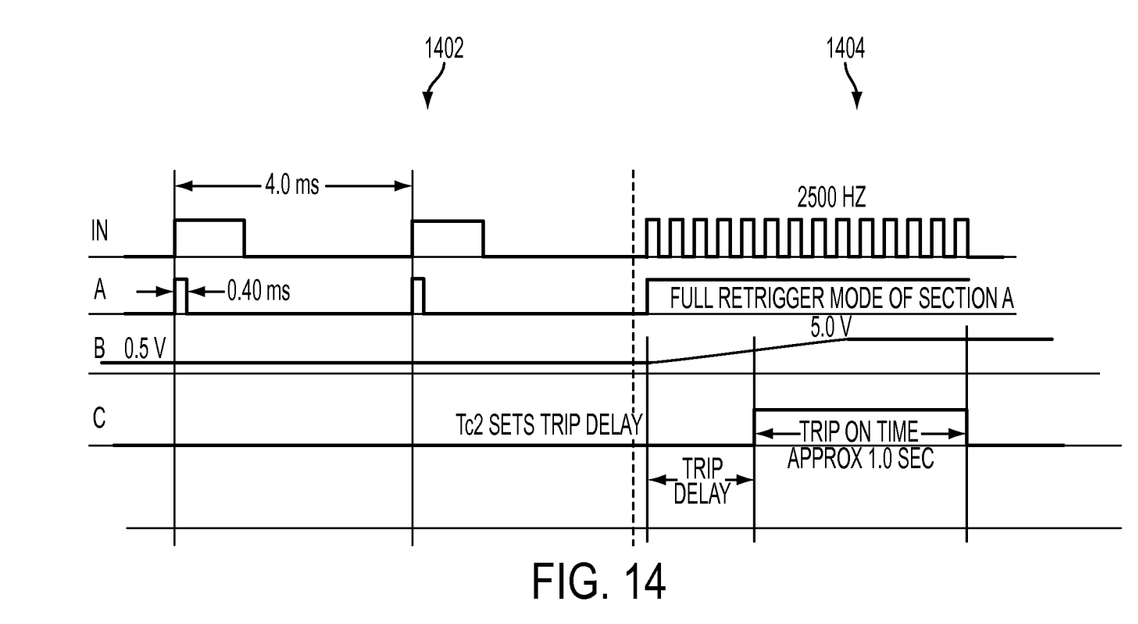
FIG. 14 is a timing diagram including plots of voltages at points in the circuit portion of FIG. 13A vs. time in an exemplary system consistent with the present disclosure.

FIG. 14 includes plots of timing diagrams associated with FIGS. 13A and 13B. A first portion 1402 of the plots in FIG. 14 corresponds to normal operation and a second portion 1404 corresponds to a fault condition. During normal operation with a PWM rate of 250 Hz, an output of a first retriggerable monostable multivibrator U1A (Point A) is a relatively narrow fixed width pulse of width approximately 0.40 ms (millisecond) and occurring at a frequency of about 250 Hz (i.e., a period of about 4.0 ms) (first portion 1402). For example, the PWM input signal, from, e.g., the ECU, is illustrated as plot IN in FIG. 14. The voltage at Point A is illustrated as plot A, in FIG. 14. The signal at Point A may then be averaged by a low pass filter including a resistor Rx and a capacitor Cx. At Point B, the output of the low pass filter, for the 250 Hz PWM input, yields a DC signal of about 0.5 volts (first portion 1402). The waveform associated with Point B is illustrated as plot B in FIG. 14. The output of the low pass filter may be independent of the duty cycle of the PWM input signal and is insufficient to trigger a second retriggerable monostable multivibrator U1B. In other words, the output of the low pass filter is below a trigger threshold of U1B and the output of U1B remains at or near zero (first portion 1404 of plot C). Normal operation of the SBW system may then continue.

In a fault condition, a return to park (RTP) command may be initiated by increasing the clock rate (i.e., the frequency) of the PWM input signal from the 250 Hz normal frequency to a fault frequency of, e.g., 2500 Hz. The PWM input signal for a fault condition is illustrated in the second portion 1404 of plot IN of FIG. 14. When the PWM input signal is increased to 2500 Hz, the voltage at Point A may step up to 5 Vdc and remain constant at this voltage (second portion 1404, plot A). The voltage at Point B (output of the low pass filter) may then ramp up to 5 Vdc (plot B, second portion 1404). As the voltage at Point B ramps up, U1B is configured to produce a single 5 volt pulse of approximately 1 second duration at its output, Point C (plot C, second portion 1404). The pulse at Point C is configured to drive outputs of a tristate device, e.g., three state buffer U2, from an open circuit output state to an output code of 1001 (binary).

Referring now to FIG. 13B, when the output of tristate device U2 is open, a processor 1310 is configured to control an H-bridge 1312 to drive the fail safe motor 214. When the output of the tristate device U2 corresponds to 1001 binary, the tristate device U2 may override the processor 1310 and control the H-bridge 1312 to drive the fail safe motor 214 to a PARK position, as described herein.

Voltage Vcap for driving the fail safe motor 214 to the PARK position may be provided by a storage capacitor (e.g., four 11,000 uF capacitors), as described herein. Power may be supplied to the circuitry of FIG. 13A by a voltage regulator 1314 configured to receive input power from the vehicle battery and/or the storage capacitor. The SBW system 10 may include one or more storage capacitors configured to supply power to the fail safe motor 214 and/or control electronics, as described herein. Accordingly, the fail safe motor 214 and/or the system of FIGS. 13A and 13B are configured to operate in the event of a loss of other voltage sources. Further, a PWM output signal that may fail high, e.g., at 5 volts, may not cause inadvertent return-to-park operation.

Figure 15:
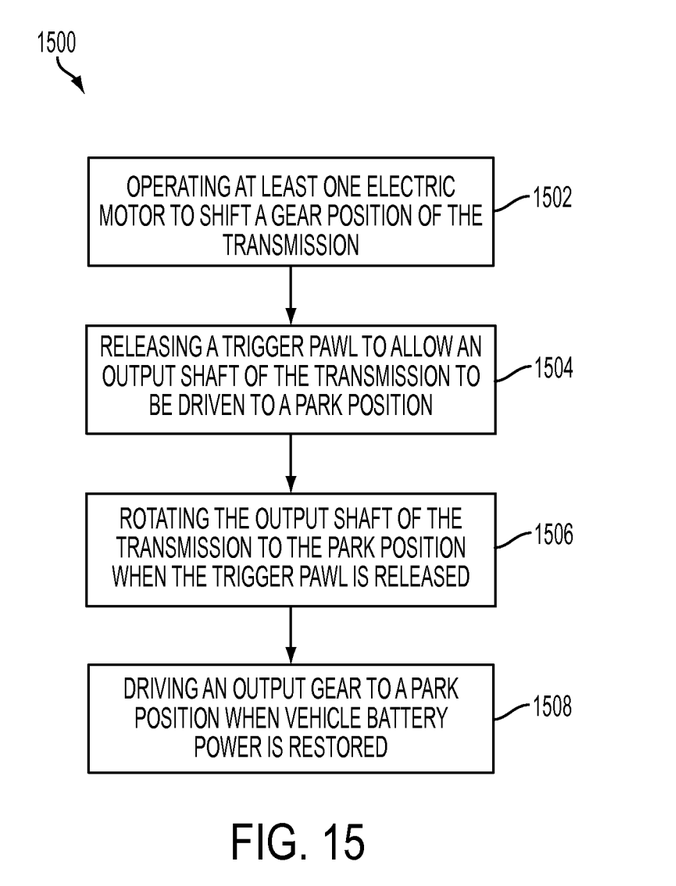
FIG. 15 is an exemplary flow chart for actuating a shift-by-wire range selector system consistent with the present disclosure.

FIG. 15 is an exemplary flow chart 1500 for actuating a shift-by-wire range selector system consistent with the present disclosure. Operation 1502 may include operating at least one of electric motor to shift a gear position of the transmission. Operation 1504 may include releasing a trigger pawl to allow an output shaft of the transmission to be driven to a PARK position using a fail safe release motor in response to a failure in at least one of a vehicle battery power to the shift-by-wire transmission range selector system and communication with the shift-by-wire transmission range selector system. Operation 1506 may include rotating the output shaft of the transmission to the PARK position when the trigger pawl is released using a torsion spring. Operation 1508 may include driving an output gear to a PARK position when vehicle battery power is restored using the at least one motor.

Accordingly, a shift-by-wire transmission range selector system consistent with the present disclosure may include an actuator a single motor or redundant electric motors to allow the actuator to operate for shifting the gear position of a transmission after failure of one motor. Also, the dual, redundant motor configuration allows the actuator to provide required output torque for changing the gear position at low voltage and high temperature without requiring significant gear reduction. In the event of a power or system failure, a fail safe release motor is actuated by energy stored in a capacitor. The fail safe release motor may drive a slide cam to release a trigger arm. Upon release of the trigger arm, a spring-driven mechanism safely returns the transmission to the PARK position by rotating an output shaft. A magnet coupled to the output shaft may provide rotational position information to electronics on a printed circuit board (PCB) for controlling the system. A redundant control link may be provided, configured to actuate the fail safe release motor in the event of a power or system failure.

According to one aspect, there is provided a shift-by-wire transmission range selector system including an electronic control module; an automotive transmission; and an actuator coupled to the automotive transmission. The actuator may include at least one electric motor configured to drive an output shaft through a gear train for shifting a gear position of the automotive transmission; and a fail safe release motor configured to release a trigger pawl to allow an output shaft of the transmission to be driven to a PARK in response to a failure vehicle battery power to the shift-by-wire transmission range selector system.

According to another aspect, there is provided an actuator for a shift-by-wire transmission system. The actuator may include at least one electric motor configured to drive an output shaft through a gear train for shifting a gear position of the automotive transmission; and a fail safe release motor configured to release a trigger pawl to allow an output shaft of the transmission to be driven to a PARK in response to a failure vehicle battery power to the shift-by-wire transmission range selector system.

According to another aspect there is provided a method of actuating a shift-by-wire range selector system, the method including: operating at least one electric motor to shift a gear position of an automotive transmission through a gear train; operating a failsafe release motor to release a trigger pawl to allow an output shaft of the transmission to be driven to a PARK position in response to a failure in vehicle battery power to the shift-by-wire transmission range selector system; rotating the output shaft of the transmission to the PARK position when the trigger pawl is released using a torsion spring; and operating the at least one electric motor to drive an output gear of the gear train to a PARK position when vehicle battery power is restored.

The embodiments that have been described herein, however, are but some of the several which utilize this invention and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention.

What is claimed is:

1. A shift-by-wire transmission range selector system comprising:
    an electronic control module;
    an automotive transmission; and
    an actuator coupled to said automotive transmission, said actuator comprising:
        at least one electric motor configured to drive an output shaft through a gear train for shifting a gear position of said automotive transmission;
        a guide slot;
        a trigger arm;
        a trigger pawl;
        a spring; and
        a fail safe release motor configured to rotate in response to an applied voltage to cause said trigger arm to move within said guide slot thereby causing said trigger pawl to rotate to allow said spring to rotate said output shaft of said transmission to a PARK in response to a failure of vehicle battery power to the shift-by-wire transmission range selector system.

2. The system of claim 1, further comprising a plurality of said electric motors, one of the plurality of electric motors is configured to drive said output shaft through said gear train for shifting said gear position of said transmission upon failure of another of said plurality of motors.

3. The system of claim 1, further comprising a slide cam including said guide slot, wherein the fail safe release motor is configured to drive the slide cam to drive the trigger arm to rotate the trigger pawl.

4. The system of claim 1, wherein the fail safe release motor is configured to rotate and cause the trigger arm to move within said guide slot into a normal position when vehicle battery power is restored.

5. The system of claim 4, wherein said at least one electric motor is configured to drive said output gear of said gear train to a PARK position when vehicle battery power is restored.

6. The system of claim 1, further comprising a pawl torsion spring configured to rotate the trigger pawl into a locked position for normal operation.

7. The system of claim 1, at least one storage capacitor coupled to said fail safe release motor for providing said applied voltage to rotate said fail safe release motor upon failure vehicle battery power to the shift-by-wire transmission range selector system.

8. The system of claim 7, a charging circuit coupled to said at least one storage capacitor for charging said at least one storage capacitor to a voltage greater than a vehicle normal battery voltage.

9. An actuator for a shift-by-wire transmission range selector system, said actuator comprising:
at least one electric motor configured to drive an output shaft through a gear train for shifting a gear position of a transmission;
a guide slot;
a trigger arm;
a trigger pawl;
a spring; and
a fail safe release motor configured to rotate in response to an applied voltage to cause said trigger arm to move within said guide slot thereby causing said trigger pawl to rotate to allow said spring to rotate said output shaft of said transmission to a PARK in response to a failure of vehicle battery power to the shift-by-wire transmission range selector system.

10. The actuator of claim 9, further comprising a plurality of said electric motors, one of the plurality of electric motors is configured to drive said output shaft through said gear train for shifting said gear position of said transmission upon failure of another of said plurality of motors.

11. The actuator of claim 9, further comprising a slide cam including said guide slot, wherein the fail safe release motor is configured to drive the slide cam to drive the trigger arm to rotate the trigger pawl.

12. The actuator of claim 9, wherein the fail safe release motor is configured to rotate and cause the trigger arm to a normal position when vehicle battery power is restored.

13. The actuator of claim 12, wherein said at least one electric motor is configured to drive said output gear of said gear train to a PARK position when vehicle battery power is restored.

14. The actuator of claim 9, further comprising a pawl torsion spring configured to rotate the trigger pawl into a locked position for normal operation.

15. The actuator of claim 9, at least one storage capacitor coupled to said fail safe release motor for providing said applied voltage to rotate said fail safe release motor upon failure vehicle battery power to the shift-by-wire transmission range selector system.

16. The actuator of claim 15, a charging circuit coupled to said at least one storage capacitor for charging said at least one storage capacitor to a voltage greater than a vehicle normal battery voltage.

17. An actuator for a shift-by-wire transmission range selector system, said actuator comprising:
at least one electric motor configured to drive an output shaft through a gear train for shifting a gear position of a transmission;
a guide slot;
a trigger arm;
a spring coupled between said gear train and said output shaft; and
a fail safe release motor configured to rotate in response to an applied voltage to cause said trigger arm to move within said guide slot thereby causing a trigger pawl to allow said spring to rotate said output shaft of said transmission to a PARK while said gear train remains stationary in response to a failure of vehicle battery power to the shift-by-wire transmission range selector system.

18. The actuator of claim 17, further comprising a plurality of said electric motors, one of the plurality of electric motors is configured to drive said output shaft through said gear train for shifting said gear position of said transmission upon failure of another of said plurality of motors.

19. The actuator of claim 17, further comprising a slide cam including said guide slot, wherein the fail safe release motor is configured to drive the slide cam to drive the trigger arm to rotate the trigger pawl.

20. The actuator of claim 17, wherein the fail safe release motor is configured to rotate and cause the trigger arm to move within said guide slot into a normal position when vehicle battery power is restored.

* * * * *